(12) United States Patent
Howes et al.

(10) Patent No.: US 9,531,743 B2
(45) Date of Patent: *Dec. 27, 2016

(54) DATA TREND ANALYSIS

(71) Applicant: Accenture Global Services Limited, Dublin (IE)

(72) Inventors: Joshua Z. Howes, Arlington, VA (US); James Solderitsch, Rosemont, PA (US); Ryan M. Lasalle, Alexandria, VA (US); David W. Rozmiarek, Falls Church, VA (US); Eric A. Ellett, Chevy Chase, MD (US)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 15/147,471

(22) Filed: May 5, 2016

(65) Prior Publication Data

US 2016/0248793 A1  Aug. 25, 2016

Related U.S. Application Data

(63) Continuation of application No. 13/826,965, filed on Mar. 14, 2013, now Pat. No. 9,355,172.
(Continued)

(51) Int. Cl.
*G06F 11/00* (2006.01)
*H04L 29/06* (2006.01)
(Continued)

(52) U.S. Cl.
CPC ....... *H04L 63/1425* (2013.01); *G06F 17/2785* (2013.01); *G06F 17/30705* (2013.01);
(Continued)

(58) Field of Classification Search
CPC .. G06F 17/30705; G06F 21/55; G06F 21/552; G06F 2221/2151; G06F 17/30734; G06F 17/2785; G06F 21/566; G06F 17/30864; G06F 17/30867; G06F 21/561; G06F 21/6245; H04L 63/1425; H04L 63/1466; H04W 12/08; Y10S 707/99935; G06N 5/00
(Continued)

(56) References Cited

U.S. PATENT DOCUMENTS 7,890,514 B1    2/2011  Mohan et al.
8,095,559 B2    1/2012  Robertson et al.
(Continued)

OTHER PUBLICATIONS

Morris, T.I. et al., "A perceptually-relevant model-based cyber threat prediction method for enterprise mission assurance", CogSIMA 2011 IEEE, Feb. 2011.
(Continued)

*Primary Examiner* — Nirav B Patel
(74) *Attorney, Agent, or Firm* — Mannava & Kang, P.C.

(57) ABSTRACT

According to an example, a method for data trend analysis may include retrieving data from data sources, associating the data with a time, and identifying co-occurrences of terms and concepts within the data. In response to determining that co-occurrences of term and concept pairs reach a predefined threshold, the method may include adding the term and concept pairs to an ontology. The method may include logging occurrences of terms in the ontology within the data with respect to associated data times, identifying a plurality of time periods, and for one of the plurality of time periods and for the logged terms, determining a first score indicative of a weighted term frequency metric for a logged term within the data during the one time period, and determining a second score indicative of a commonality of a presence of the logged term within the data among the plurality of time periods.

20 Claims, 11 Drawing Sheets

Related U.S. Application Data

(60) Provisional application No. 61/751,252, filed on Jan. 10, 2013.

(51) Int. Cl.
*G06F 17/30* (2006.01)
*G06F 21/55* (2013.01)
*G06F 17/27* (2006.01)

(52) U.S. Cl.
CPC .. *G06F 17/30716* (2013.01); *G06F 17/30734* (2013.01); *G06F 17/30864* (2013.01); *G06F 21/55* (2013.01); *G06F 21/552* (2013.01); *G06F 2221/2151* (2013.01)

(58) Field of Classification Search
USPC .... 726/22–25; 707/746, 730, 737, 728, 769, 707/741, 603, 750, 759, 736
See application file for complete search history.

(56) References Cited

U.S. PATENT DOCUMENTS

| | | | |
|---|---|---|---|
| 8,166,032 B2 | 4/2012 | Sommer et al. | |
| 8,191,149 B2 | 5/2012 | Yun et al. | |
| 8,255,347 B2 | 8/2012 | Ellingsworth | |
| 8,266,148 B2 | 9/2012 | Guha et al. | |
| 8,527,513 B2 | 9/2013 | Zhang et al. | |
| 8,533,840 B2* | 9/2013 | Redlich | G06F 21/6245 707/708 |
| 8,738,552 B2 | 5/2014 | Ellingsworth | |
| 8,862,565 B1 | 10/2014 | Chipalkatti et al. | |
| 8,874,558 B1 | 10/2014 | He et al. | |
| 9,123,046 B1 | 9/2015 | Yuksel | |
| 2002/0038430 A1 | 3/2002 | Edwards et al. | |
| 2004/0236725 A1* | 11/2004 | Amitay | G06F 17/30672 |
| 2006/0074632 A1* | 4/2006 | Nanavati | G06F 17/2785 704/9 |
| 2009/0048904 A1 | 2/2009 | Newton et al. | |
| 2010/0100537 A1 | 4/2010 | Druzgalski | |
| 2012/0096552 A1 | 4/2012 | Paek et al. | |
| 2012/0221485 A1 | 8/2012 | Leidner et al. | |
| 2012/0239694 A1 | 9/2012 | Avner et al. | |
| 2013/0226865 A1 | 8/2013 | Munemann | |

OTHER PUBLICATIONS

Gloor, P. et al., "Web Science 2.0: Identifying Trends through Semantic Social Network Analysis", Computational Science and Engineering, 2009. CSE '09. International Conf.

Veda, "Social Media Analysis", download date Mar. 14, 2013. http://vedasemantics.com/social_analysis.html.

Kim, D.H. et al., "Cyber Threat Trend Analysis Model Using HMM", In proceeding of: Information Assurance and Security, 2007. IAS 2007.

Cimiano, P. et al., "Text2Onto—A Framework for Ontology Learning and Data-driven Change Discovery", NLDB Jun. 2005.

Maynard, D. et al., "NLP Techniques for Term Extraction and Ontology Population", Proceedings of the 2008 conference on Ontology Learning and Population, 2008.

Shusaku Tsumoto, et al. "Comparing similarity of concepts identified by temporal patterns of terms in biomedical research documents", 2012 IEEE 11th International Conference on Cognitive Informatics & Cognitive Computing (ICCI*CC 2012), Aug. 22, 2012, pp. 86-93.

Hidenao Abe, et al., "Trend detection from large text data", 2010 IEEE International Conference on Systems Man and Cybernetics (SMC), Oct. 10, 2010, pp. 310-315.

"Search Report on European Patent Application EP 13004241.9", European Patent Office, dated Feb. 4, 2014.

\* cited by examiner

LIST OF TERM COUNTS

| time_period | term | count |
|---|---|---|
| 2011-07-04 | Virus | 215 |
| 2011-07-05 | Virus | 278 |
| 2011-07-04 | Worm | 184 |
| ... | ... | ... |

FIG. 4

TERM WEIGHTING

```
# Calculate the like/dislike multiplier that adjusts
# the TF-IPF statistic based on the user preferences
like_multipler = Math.log(likes + 1, 10) / 2
dislike_multipler = Math.log(dislikes + 1, 10) / 2
netlike_multipler = like_multipler - dislike_multipler + 1
# adjust score with the 'Net Like' multipler
adjusted_tfipf = tfipf.value * netlike_multipler
```

FIG. 5

Term-Frequency

| Date | Java | Malware | Denial of Service | Exploit | Cloud | Test Case 1 | Test Case 2 | Mobile | ... | Total |
|---|---|---|---|---|---|---|---|---|---|---|
| 7/4/2007 | 162 | 267 | 26 | 266 | 113 | 10000 | 0 | 73 | ... | 10,907 |
| 7/5/2007 | 134 | 297 | 42 | 267 | 114 | 10000 | 0 | 87 | ... | 10,941 |
| 7/6/2007 | 191 | 282 | 20 | 222 | 47 | 10000 | 1 | 96 | ... | 10,859 |
| 7/7/2007 | 121 | 265 | 37 | 259 | 53 | 10000 | 0 | 107 | ... | 10,842 |
| 7/8/2007 | 107 | 300 | 49 | 266 | 58 | 100000 | 0 | 98 | ... | 100,878 |
| 7/9/2007 | 123 | 210 | 75 | 256 | 57 | 10000 | 0 | 73 | ... | 10,794 |
| 7/10/2007 | 108 | 270 | 80 | 294 | 57 | 10000 | 0 | 84 | ... | 10,893 |
| 7/11/2007 | 167 | 273 | 73 | 300 | 49 | 10000 | 0 | 78 | ... | 10,940 |
| ... | ... | ... | ... | ... | ... | | | ... | ... | - |
| Mean | 139.13 | 270.50 | 50.25 | 266.25 | 68.50 | 21,250.00 | 0.13 | 87.00 | | 22,131.75 |
| Sum | 1,113 | 2,164 | 402 | 2,130 | 548 | 170,000 | 1 | 696 | | 177,054 |
| p(t) | 0.0063 | 0.0122 | 0.0023 | 0.0120 | 0.0031 | 0.9602 | 0.0000 | 0.0039 | | 1.00 |

*FIG. 6A*

Weighted Frequency: LOG(Term-Frequency)

| Date | Java | Malware | Denial of Service | Exploit | Cloud | Test Case 1 | Test Case 2 | Mobile | ... |
|---|---|---|---|---|---|---|---|---|---|
| 7/4/2007 | 2.210 | 2.427 | 1.415 | 2.425 | 2.053 | 4.000 | 0.000 | 1.863 | ... |
| 7/5/2007 | 2.127 | 2.473 | 1.623 | 2.427 | 2.057 | 4.000 | 0.000 | 1.940 | ... |
| 7/6/2007 | 2.281 | 2.450 | 1.301 | 2.346 | 1.672 | 4.000 | 0.000 | 1.982 | ... |
| 7/7/2007 | 2.083 | 2.423 | 1.568 | 2.413 | 1.724 | 4.000 | 0.000 | 2.029 | ... |
| 7/8/2007 | 2.029 | 2.477 | 1.690 | 2.425 | 1.763 | 5.000 | 0.000 | 1.991 | ... |
| 7/9/2007 | 2.090 | 2.322 | 1.875 | 2.408 | 1.756 | 4.000 | 0.000 | 1.863 | ... |
| 7/10/2007 | 2.033 | 2.431 | 1.903 | 2.468 | 1.756 | 4.000 | 0.000 | 1.924 | ... |
| 7/11/2007 | 2.223 | 2.436 | 1.863 | 2.477 | 1.690 | 4.000 | 0.000 | 1.892 | ... |
| ... | ... | ... | ... | ... | ... | | | ... | ... |
| Mean | 2.13 | 2.43 | 1.65 | 2.42 | 1.81 | 4.13 | - | 1.94 | |
| Sum | 17 | 19 | 13 | 19 | 14 | 33 | - | 15 | |

| Commonality Metric: LOG(1/P(term)) | | | | | | | | |
|---|---|---|---|---|---|---|---|---|
| Date | Java | Malware | Denial of Service | Exploit | Cloud | Test Case 1 | Test Case 2 | Mobile | ... |
| 7/4/2007 | 2.20161 | 1.91285 | 2.64388 | 1.91973 | 2.50933 | 0.01766 | 5.24811 | 2.40550 | ... |
| 7/5/2007 | 2.20161 | 1.91285 | 2.64388 | 1.91973 | 2.50933 | 0.01766 | 5.24811 | 2.40550 | ... |
| 7/6/2007 | 2.20161 | 1.91285 | 2.64388 | 1.91973 | 2.50933 | 0.01766 | 5.24811 | 2.40550 | ... |
| 7/7/2007 | 2.20161 | 1.91285 | 2.64388 | 1.91973 | 2.50933 | 0.01766 | 5.24811 | 2.40550 | ... |
| 7/8/2007 | 2.20161 | 1.91285 | 2.64388 | 1.91973 | 2.50933 | 0.01766 | 5.24811 | 2.40550 | ... |
| 7/9/2007 | 2.20161 | 1.91285 | 2.64388 | 1.91973 | 2.50933 | 0.01766 | 5.24811 | 2.40550 | ... |
| 7/10/2007 | 2.20161 | 1.91285 | 2.64388 | 1.91973 | 2.50933 | 0.01766 | 5.24811 | 2.40550 | ... |
| 7/11/2007 | 2.20161 | 1.91285 | 2.64388 | 1.91973 | 2.50933 | 0.01766 | 5.24811 | 2.40550 | ... |
| ... | ... | ... | ... | ... | ... | | | ... | ... |

| Trending Metric | | | | | | | | |
|---|---|---|---|---|---|---|---|---|
| Date | Java | Malware | Denial of Service | Exploit | Cloud | Test Case 1 | Test Case 2 | Mobile | ... |
| 7/4/2007 | 4.864 | 4.642 | 3.741 | 4.655 | 5.152 | 0.071 | 0.000 | 4.482 | ... |
| 7/5/2007 | 4.683 | 4.730 | 4.292 | 4.658 | 5.161 | 0.071 | 0.000 | 4.666 | ... |
| 7/6/2007 | 5.022 | 4.687 | 3.440 | 4.504 | 4.196 | 0.071 | 0.000 | 4.768 | ... |
| 7/7/2007 | 4.585 | 4.635 | 4.146 | 4.633 | 4.327 | 0.071 | 0.000 | 4.882 | ... |
| 7/8/2007 | 4.468 | 4.738 | 4.469 | 4.655 | 4.425 | 0.088 | 0.000 | 4.790 | ... |
| 7/9/2007 | 4.601 | 4.442 | 4.957 | 4.623 | 4.406 | 0.071 | 0.000 | 4.482 | ... |
| 7/10/2007 | 4.477 | 4.651 | 5.032 | 4.739 | 4.406 | 0.071 | 0.000 | 4.629 | ... |
| 7/11/2007 | 4.894 | 4.660 | 4.926 | 4.755 | 4.241 | 0.071 | 0.000 | 4.551 | ... |

*FIG. 6D*

DATA TREND ANALYSIS

PRIORITY

This application is a Continuation of commonly assigned and co-pending U.S. patent application Ser. No. 13/826,965, filed Mar. 14, 2013, which claims the benefit of provisional patent application U.S. Ser. No. 61/751,252, filed Jan. 10, 2013, the disclosure of which are hereby incorporated by reference in their entireties.

BACKGROUND

Data sources can include a substantial amount of information related to various topics. Examples of data sources can include databases, computer files, data streams, raw data originating from observation, survey and research, and generally any source that can be used to obtain digitized data. Data sources may be categorized, for example, as structured, semi-structured, or unstructured data sources. Structured data sources may include data sources that are identifiable based on a structural organization. Structured data in such structured data sources may also be searchable by data type within data content. Unstructured data may include data such as raw unstructured text that does not include an identifiable structural organization. Semi-structured data may include data that includes structured data that is searchable by data type within content and unstructured data. Based, for example, on the vast amounts of information available in such structured, semi-structured, and unstructured data sources, it can be challenging to analyze such data sources to identify data trends.

BRIEF DESCRIPTION OF DRAWINGS

Features of the present disclosure are illustrated by way of examples shown in the following figures. In the following figures, like numerals indicate like elements, in which:

FIG. 4 illustrates a list of term counts, according to an example of the present disclosure;

FIG. 5 illustrates a process for term weighting, according to an example of the present disclosure;

FIGS. 6A-6D illustrate scoring of ontology-factored threats for an application of the data trend analysis system to threat trend analysis, according to an example of the present disclosure;

DETAILED DESCRIPTION

Figure 1:
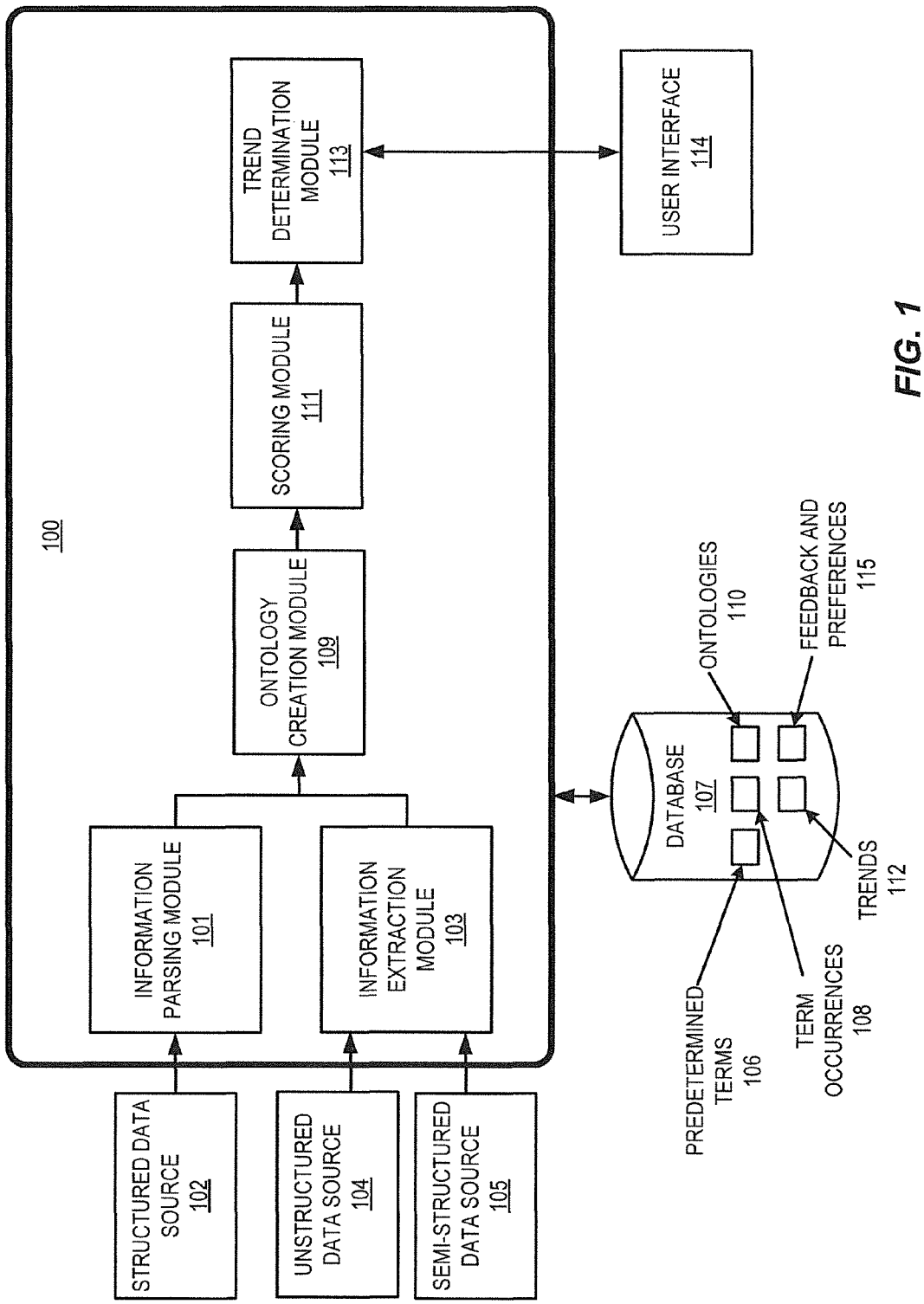
FIG. 1 illustrates an architecture of a data trend analysis system, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Data trend analysis may include, for example, the collection of information and the determination of a pattern, or trend, in the information. Data trend analysis may be used, for example, to predict future events, and to estimate uncertain events in the past. For information that can be available in a variety of structured, semi-structured, and unstructured data sources, it can be challenging to analyze such data sources and the vast amounts of data contained therein to identify data trends. For example, a data trend analysis expert may aggregate data and attempt to provide a perspective into trends associated with the data. However, such trend analysis can be biased based on the subjective understanding of the expert. Such trend analysis may also be limited by factors such as time constraints, expert knowledge, the type of data sources analyzed, and goals associated with the trend analysis.

For example, in the area of cyber security, a threat intelligence expert or a threat related product may be used to aggregate and report security information to provide a perspective into a current cyber security landscape. The threat intelligence expert may ascertain threat intelligence from vendors that specialize in particular areas and provide information in a structured format. However, threat intelligence information is often available in unstructured data sources, such as Internet forum postings, news articles, blogs, etc., and semi-structured data sources, such as spreadsheets, etc. A comprehensive analysis of such structured, semi-structured, and unstructured data sources can provide valuable insight into data trends compared to techniques limited to evaluation of structured data, or reliance on expert knowledge.

A data trend analysis system and a method for data trend analysis are disclosed herein. The system and method disclosed herein may be applied to a variety of fields, such as cyber security, marketing, sales, etc. According to an example, the data trend analysis system disclosed herein may include a memory storing machine readable instructions to retrieve data from one or more data sources, associate the data with a time, and identify co-occurrences of terms and concepts within the data. In response to determining that co-occurrences of term and concept pairs reach a predefined threshold, the machine readable instructions may add the term and concept pairs to an ontology. The machine readable instructions may further log occurrences of terms in the ontology within the data with respect to associated data times, and identify a plurality of time periods. For one of the plurality of time periods and for the logged terms, the machine readable instructions may determine a first score indicative of a weighted term frequency metric for a logged term within the data during the one time period, and determine a second score indicative of a commonality of a presence of the logged term within the data among the plurality of time periods. The machine readable instructions may further determine a third score indicative of the weighted term frequency metric for the logged term during the one time period and the commonality of the presence of the logged term among the plurality of time periods. The data trend analysis system may further include a processor to implement the machine readable instructions.

According to another example, the method for data trend analysis disclosed herein may include retrieving data from one or more data sources, associating the data with a time, and identifying co-occurrences of terms and concepts within the data. Retrieving data from the one or more data sources may include retrieving the data from structured, unstructured, and/or semi-structured data sources. For the structured data source, retrieving the data may include parsing the data. For the unstructured or the semi-structured data sources, terms of an ontology may be identified and extracted from the unstructured or the semi-structured data sources. The co-occurrences of terms and concepts within the data may be performed, for example, by using Latent Semantic Analysis (LSA). In response to determining that co-occurrences of term and concept pairs reach a predefined threshold, the method disclosed herein may include adding the term and concept pairs to an ontology. Further, the method disclosed herein may include logging occurrences of terms in the ontology within the data with respect to associated data times, and identifying a plurality of time periods. For one of the plurality of time periods and for the logged terms, the method disclosed herein may include determining a first score indicative of a weighted term frequency metric for a logged term within the data during the one time period, and determining a second score indicative of a commonality of a presence of the logged term within the data among the plurality of time periods. Determination of the second score may include determining a quotient value by dividing a count of occurrences of the logged term across the plurality of time periods by a count of occurrences of the logged terms across the plurality of time periods, and determining a logarithm of an inverse of the quotient value. The method disclosed herein may further include determining a third score indicative of the weighted term frequency metric for the logged term during the one time period and the commonality of the presence of the logged term among the plurality of time periods. The method disclosed herein may further include filtering the logged terms based on user preferences by multiplying the third score by a user-preference factor, filtering the logged terms based on community feedback by multiplying the third score by a community feedback factor, and prioritizing the filtered logged terms based on an ascending or a descending order related to the third score.

According to a further example, a method for forecasting cyber security threat risks is disclosed herein and may include retrieving cyber security threat information from structured data sources, retrieving cyber security threat related information from semi-structured and un-structured data sources, and extracting additional cyber security threat information from the retrieved cyber security threat related information. The method may further include identifying co-occurrences of threat-related terms and threat-related concepts within the cyber security threat information and the additional cyber security threat information, and in response to determining that co-occurrences of threat-related term and threat-related concept pairs reach a predefined threshold, adding the term and concept pair to an ontology. The method disclosed herein may further include logging occurrences of terms in the ontology within the cyber security threat information or the cyber security threat related information or both with respect to time, and identifying a plurality of time periods. For one of the plurality of time periods and for the logged terms, the method disclosed herein may include determining a first score indicative of a weighted term frequency metric for the logged term during the one time period, and determining a second score indicative of a commonality of a presence of the logged term among the plurality of time periods.

The data trend analysis system and the method for data trend analysis disclosed herein provide a technical solution to the technical problem of data trend analysis for information available, for example, in structured, semi-structured, and unstructured data sources. In many instances, manual data trend analysis is not a viable solution given the heterogeneity and complexities associated with data sources that can include a substantial amount of information related to various topics. The system and method disclosed herein provide the technical solution of automatic data trend analysis by retrieving data from one or more data sources, associating the data with a time, and identifying co-occurrences of terms and concepts within the data. In response to determining that co-occurrences of term and concept pairs reach a predefined threshold, the system and method disclosed herein provide for adding the term and concept pairs to an ontology. Further, the system and method disclosed herein provide for logging of occurrences of terms in the ontology within the data with respect to associated data times, and identifying a plurality of time periods. For one of the plurality of time periods and for the logged terms, the system and method disclosed herein provide the technical solution of determining a first score indicative of a weighted term frequency metric for a logged term within the data during the one time period, and determining a second score indicative of a commonality of a presence of the logged term within the data among the plurality of time periods. Further, the system and method disclosed herein provide the technical solution of determining a third score indicative of the weighted term frequency metric for the logged term during the one time period and the commonality of the presence of the logged term among the plurality of time periods. Based on the determination of the first, second, and third scores, and further, based on evaluation of user preferences and community feedback, the system and method disclosed herein provide the technical solution of automatically filtering and prioritizing threat trends, and displaying the threat trends.

FIG. 1 illustrates an architecture of a data trend analysis system 100, according to an example of the present disclosure. Referring to FIG. 1, the system 100 is depicted as including an information parsing module 101 to retrieve structured data from a structured data source 102, and to parse the structured data. An information extraction module 103 may retrieve data from unstructured and semi-structured data sources 104, 105, respectively, and identify and extract terms from the unstructured and semi-structured data sources 104, 105. The information parsing module 101 and the information extraction module 103 may be combined into a single module that retrieves, parses, and extracts data from the data sources 102, 104, and 105. The information extraction module 103 may identify and extract the terms based on a predetermined list of terms 106. The predetermined list of terms 106 may be stored in a database 107. Occurrences of terms from the predetermined list of terms 106 in the data from the unstructured and semi-structured data sources 104, 105 may be stored as term occurrences 108 in the database 107. Further, the structured data received from the structured data source 102 may be parsed by the information parsing module 101 based on the predetermined list of terms 106, and may also be stored as term occurrences 108 in the database 107. An ontology creation module 109 may create and/or modify one or more ontologies 110 based on co-occurrence of terms and concepts. For example, the ontology creation module 109 may provide for improvement of the predetermined list of terms 106 by using LSA to determine relationships between terms and concepts, and adding the terms and concepts to the ontologies 110 if the co-occurrence of a term and a concept pair reaches a predetermined threshold. The ontologies 110 may be used, for example, to determine relationships between the term occurrences 108. A scoring module 111 may use the term occurrences 108 and the ontologies 110 to determine trends in the content of the data sources 102, 104, and 105. The trends may be stored in the database 107 as shown at 112. A trend determination module 113 may further filter and prioritize the trends 112 in the content of the data sources 102, 104, and 105 based on user preferences and community feedback received, for example, via a user interface 114. The user preferences and community feedback may be stored in the database 107 as shown at 115. The user interface 114 may be used to further display the trends 112 in the content of the data sources 102, 104, and 105 to one or more users of the data trend analysis system 100. The user preferences and community feedback may be used, for example, to display multiple views of data trends, such as global data trends, regional data trends based on an organization's industry, and localized data trends specific to users of the data trend analysis system 100.

The modules and other components of the system 100 that perform various other functions in the system 100, may comprise machine readable instructions stored on a non-transitory computer readable medium. In addition, or alternatively, the modules and other components of the system 100 may comprise hardware or a combination of machine readable instructions and hardware.

Figure 2:
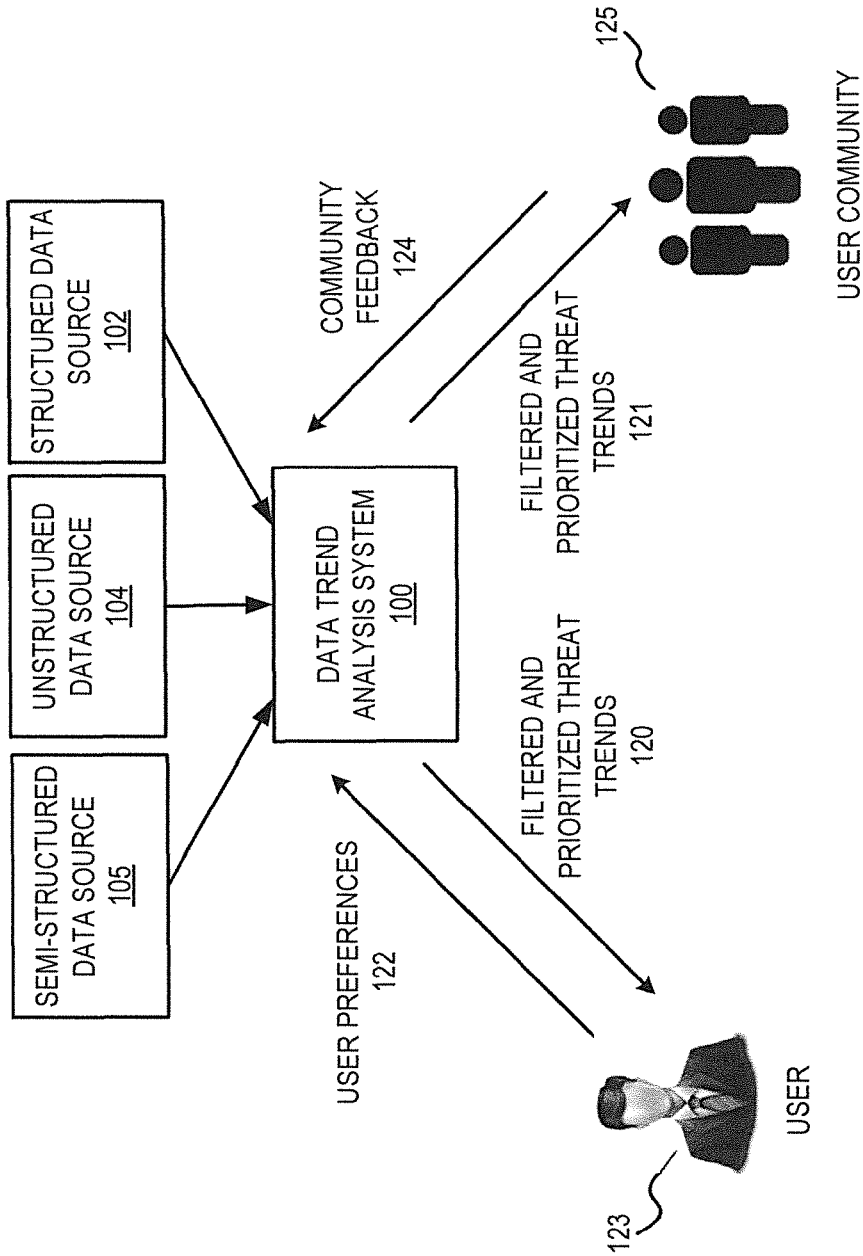
FIG. 2 illustrates an example of an application of the data trend analysis system to threat trend analysis, according to an example of the present disclosure.

The data trend analysis provided by the system 100 may be applied to a variety of fields, such as cyber security, marketing, sales, etc. Referring to FIGS. 1 and 2, FIG. 2 illustrates an example of an application of the data trend analysis system 100 to cyber security, for example, for threat trend analysis, according to an example of the present disclosure. Referring to FIGS. 1 and 2, the information parsing module 101 and the information extraction module 103 may respectively parse structured data from the structured data source 102, and extract unstructured and semi-structured data from the unstructured and semi-structured data sources 104, 105. For example, in the area of cyber security, organizations may provide structured data that is searchable by data type, such as, malware, virus, etc. Such structured data may be parsed by the information parsing module 101. For example, the information parsing module 101 may parse the structured data by using the predetermined list of terms 106. Further, in the area of cyber security, sources of unstructured data may include, for example, Internet forum postings, news articles, blogs, etc., on topics related to viruses, organizations affected by malware, virus names, etc. Such unstructured and semi-structured data (i.e., data that includes structured data that is searchable by data type within content and unstructured data) may be retrieved by the information extraction module 103 to identify and extract terms from the predetermined list of terms 106.

Referring to FIGS. 1 and 2, for the example of the application of the data trend analysis system 100 to cyber security, the trend determination module 113 may further filter and prioritize threat trends (e.g., at 120, 121 in FIG. 2) in the content of the data sources 102, 104, and 105 based on user preferences 122 received from a user 123 (e.g., a security analyst) and community feedback 124 received from a user community 125 (e.g., a plurality of user types related to the system 100). The user preferences 122 and the community feedback 124 may be received, for example, via the user interface 114. The user preferences 122 may include preferences related to an organization that is associated with the user 123, and information related to the system 100 (e.g., thresholds, display format, etc., as discussed below). The user interface 114 may be used to further display the threat trends in the content of the data sources 102, 104, and 105 to the user 123 and to the user community 125 of the data trend analysis system 100.

The information extraction module 103 may retrieve data from the unstructured and semi-structured data sources 104, 105, respectively, and identify and extract terms from the unstructured and semi-structured data sources 104, 105. The information extraction module 103 may also extract information related to the identified and extracted terms, such as date and time of identification and extraction, source identification, phrase details related to an area of application of the system 100, etc. For the example of the application of the data trend analysis system 100 to cyber security, the information extraction module 103 may extract information such as specific cyber security phrase details (e.g., the terms virus, malware, etc., and co-occurrence of concepts). The information extraction module 103 may identify and extract the terms based on the predetermined list of terms 106. For the example of the application of the data trend analysis system 100 to cyber security, the information extraction module 103 may further extract other aspects related to the extracted terms, such as organization name, name of people associated with the extracted terms, etc. For example, the information extraction module 103 may use a named-entity recognition (NER) technique to extract the additional aspects related to the extracted terms. The data trend analysis provided by the system 100 may also be directed to such other aspects related to the extracted terms. For example, the data trend analysis provided by the system 100 may be directed to a particular type of virus (e.g., ABC virus).

Figure 3:
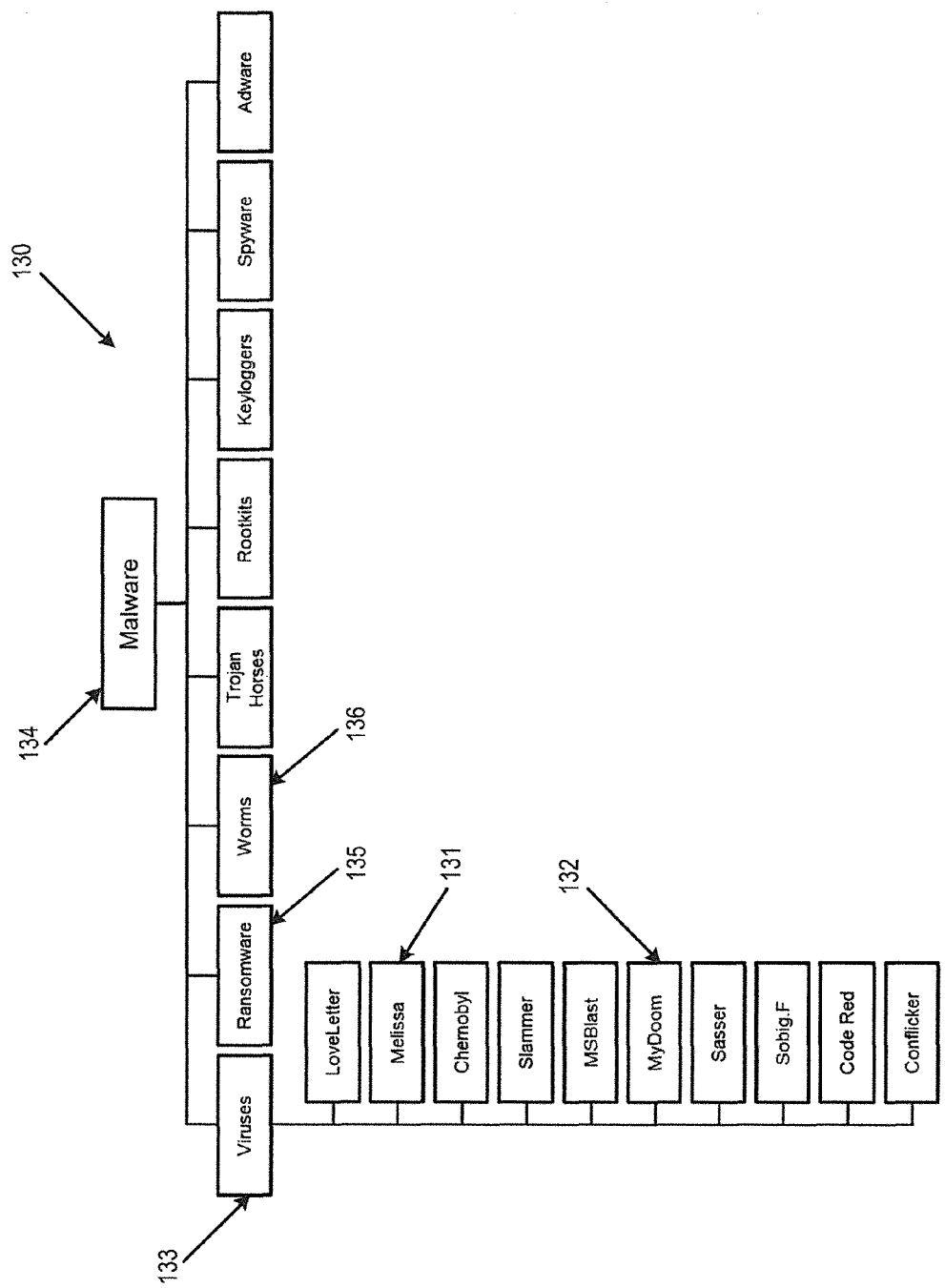
FIG. 3 illustrates a threat ontology for application of the data trend analysis system to threat trend analysis, according to an example of the present disclosure.

Referring to FIG. 1, the ontology creation module 109 may create one or more ontologies 110 based on co-occurrence of terms and concepts. For example, the ontology creation module 109 may provide for improvement of the predetermined list of terms 106 by using LSA to determine relationships between terms and concepts, and may further add the terms and concepts to the ontologies 110 if the co-occurrence of a term and a concept pair reaches a predetermined threshold (e.g., between a range of 0-1 for LSA). Concepts may defined as a word (i.e., the same or different word as a term in the predetermined list of terms 106) or a plurality of words (i.e., a plurality of the same or different words as terms in the predetermined list of terms 106). For the example of the application of the data trend analysis system 100 to cyber security, the ontologies 110 may include threat, organizational, and technology ontologies. The threat ontology may pertain to specific cyber security related threats (e.g., threats related to e-mail, threats related to user data, etc.). The organizational ontology may pertain to specific organizations that are involved in cyber security and/or affected by cyber security related threats. The technology ontology may pertain to specific technology affected by cyber security related threats. For example, FIG. 3 illustrates a portion of a threat ontology 130 for application of the data trend analysis system 100 to threat trend analysis, according to an example of the present disclosure. The threat ontology 130 may include terms, such as Melissa at 131, MyDoom at 132, etc., which respectively relate to higher order terms Viruses at 133 and Malware at 134. Additional terms may be provided in the threat ontology 130 for relation with higher order terms Ransomware at 135, Worms at 136, etc.

The scoring module 111 may use the term occurrences 108 and the ontologies 110 to determine emerging trends in the content of the data sources 102, 104, and 105. Generally, the scoring module 111 may use the term occurrences 108 and the ontologies 110 to determine emerging trends in the content of the data sources 102, 104, and 105 by using a statistic to determine the importance of terms to a given time period (e.g., hour, day, week, month, etc.). The scoring module 111 may count occurrences of each term segmented by time period. For the example of the application of the data trend analysis system 100 to cyber security, the scoring module 111 may count occurrences of each threat related term segmented by time period. For example, the scoring module 111 may generate a list of term counts 140 as shown in FIG. 4. The terms of the term counts 140 may include terms in the predetermined list of terms 106 and terms and/or concepts of the ontologies 110. The list of term counts 140 may include a time period at 141, a term designation at 142, and a term count at 143.

The scoring module 111 may further determine a first score indicative of a weighted term frequency metric for a time period. For example, the scoring module 111 may determine the first score indicative of the weighted term frequency metric as follows:

$$\text{tf}(t,p) = \log_{10} f(t,p) \qquad \text{Equation (1)}$$

For Equation (1), t may be used to designate a term, p may be used to designate a period, and $f(t,p)$ may be used to designate a frequency of a term during a period. Thus, the first score may be determined by a logarithm of a count of occurrences of a term t within the data during a time period p. Referring to FIGS. 6A and 6B, an example of determining the first score indicative of the weighted term frequency metric for a time period using Equation (1) is illustrated for application of the data trend analysis system 100 to cyber security. The weighted term frequency metric determination of FIGS. 6A and 6B shows $f(t,p)$ at 150 and 151, for example, for term JAVA at 152, and corresponding periods, for example, at 153, 154, etc. Similar $f(t,p)$ values are shown for other terms such as malware at 155, denial of service at 156, etc. Referring to FIG. 6B, first scores indicative of the weighted term frequency metrics are shown at 160, 161, etc., corresponding respectively to the $f(t,p)$ values at 150, 151, etc.

The scoring module 111 may further determine whether a term is common or rare across all the time periods by determining a second score indicative of a probabilistic inverse period frequency (IPF). Generally, the IPF may be determined by determining a quotient value that represents a probability by dividing a count of occurrences of a term across all the time periods by a count of occurrences of all terms across all the time periods, and determining a logarithm of an inverse of the quotient value. For example, the IPF may be determined as follows:

$$P(t) = \frac{\Sigma f(t,p): p \in P}{\Sigma f(t,p): \{p \in P : t \in T\}} \qquad \text{Equation (2)}$$

$$ipf(t) = \log_{10} \frac{1}{P(t)} \qquad \text{Equation (3)}$$

For Equation (2), P may be used to designate a total number of time periods, and $\{p \in P: t \in T\}$ may be used to designate all time periods and all terms. Referring to FIG. 6C, an example of IPF determination using Equations (2) and (3) is illustrated for application of the data trend analysis system 100 to cyber security. The IPF determination of FIG. 6C shows ipf(t) for example, at 170, 171, etc. corresponding to the weighted term frequency metric determination of FIGS. 6A and 6B.

The scoring module 111 may further determine top terms by calculating a third score indicative of a trending metric (i.e., TF-IPF). For example, the scoring module 111 may determine TF-IPF as follows:

$$\text{tfipf}(t,p) = \text{tf}(t,p) * ipf(t) \qquad \text{Equation (4)}$$

Referring to FIG. 6D, an example of TF-IPF determination using Equation (4) is illustrated for application of the data trend analysis system 100 to cyber security. The TF-IPF determination of FIG. 6D shows tfipf(t,p) for example, at 180, 181, etc., corresponding to the tf(t,p) determination of FIGS. 6A and 6B, and the ipf(t) determination of FIG. 6C. The TF-IPF determination for each of the terms for the term occurrences 108 may be stored as the trends 112 in the database 107.

Figure 7:
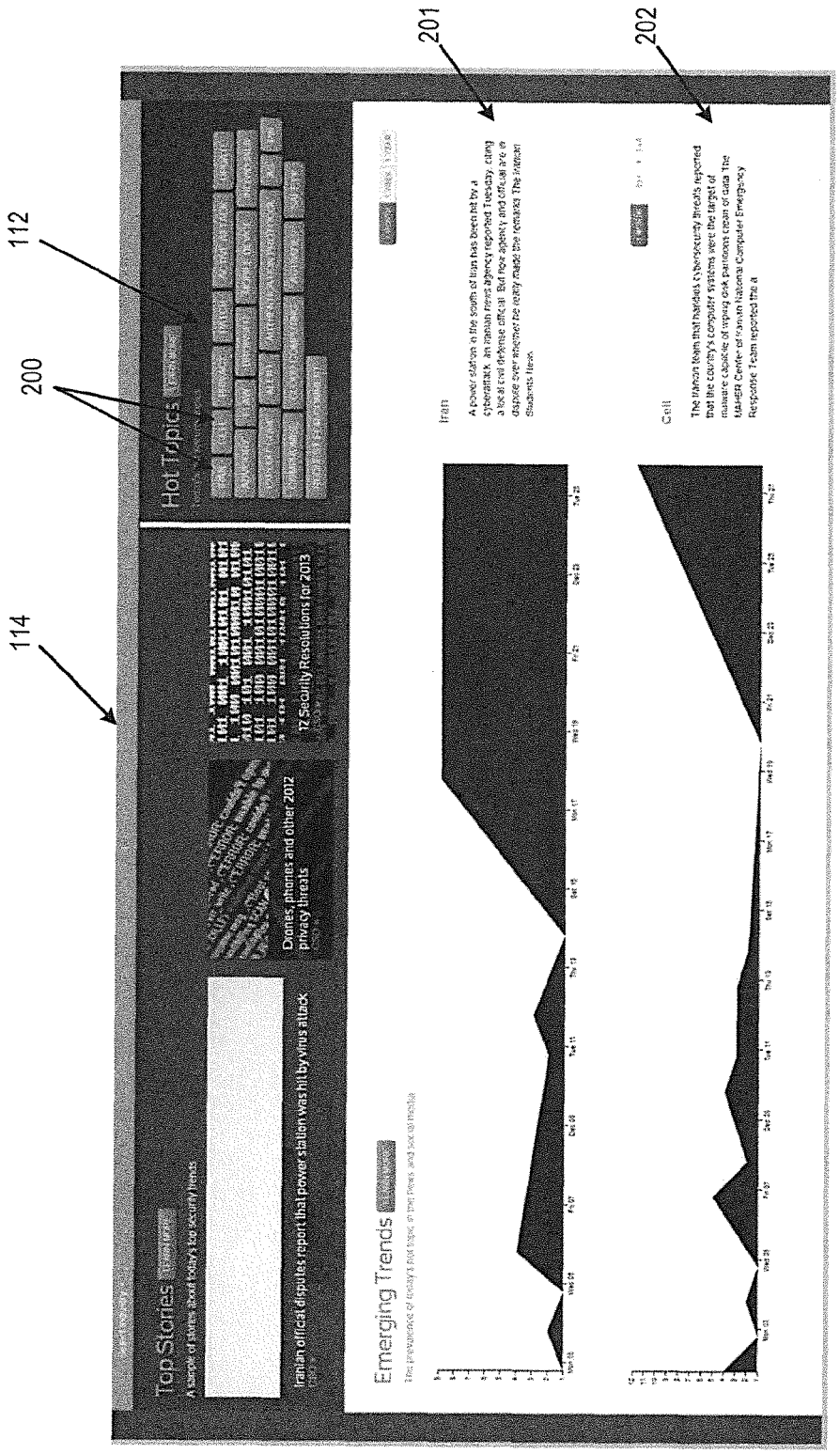
FIG. 7 illustrates a user interface display for an application of the data trend analysis system to threat trend analysis, according to an example of the present disclosure.

The trend determination module 113 may filter and prioritize the trends 112 in the content of the data sources 102, 104, and 105 based on user preferences and community feedback received, for example, via the user interface 114. For example, the trend determination module 113 may receive user preferences and community feedback such as likes, dislikes, favorites, blocked terms, etc. The trend determination module 113 may apply weighting to the TF-IPF determination to incorporate such user preferences and community feedback. For example, referring to FIG. 5, the trend determination module 113 may calculate a like multiplier at 190, a dislike multiplier at 191, and a net like multiplier at 192 that accounts for the like multiplier at 190 and the dislike multiplier at 191. The net like multiplier at 192 may be applied to the TF-IPF determination by the scoring module 111 to generate an adjusted TF-IPF value at 193. The user interface 114 may be used to further display the trends 112 in the content of the data sources 102, 104, and 105 to one or more users (not shown) of the data trend analysis system 100. For example, the user interface 114 may be used to display the trends 112 in descending order based on the corresponding adjusted TF-IPF values. For example, referring to FIG. 7, the user interface 114 may display the trends 112 in descending order based on the corresponding adjusted TF-IPF values. For example, the trends 112 may be displayed based on user preferences received via the user interface 114. A user may further select terms, for example, at 200 and additional details related to the terms may be displayed at 201, 202.

Figure 8:
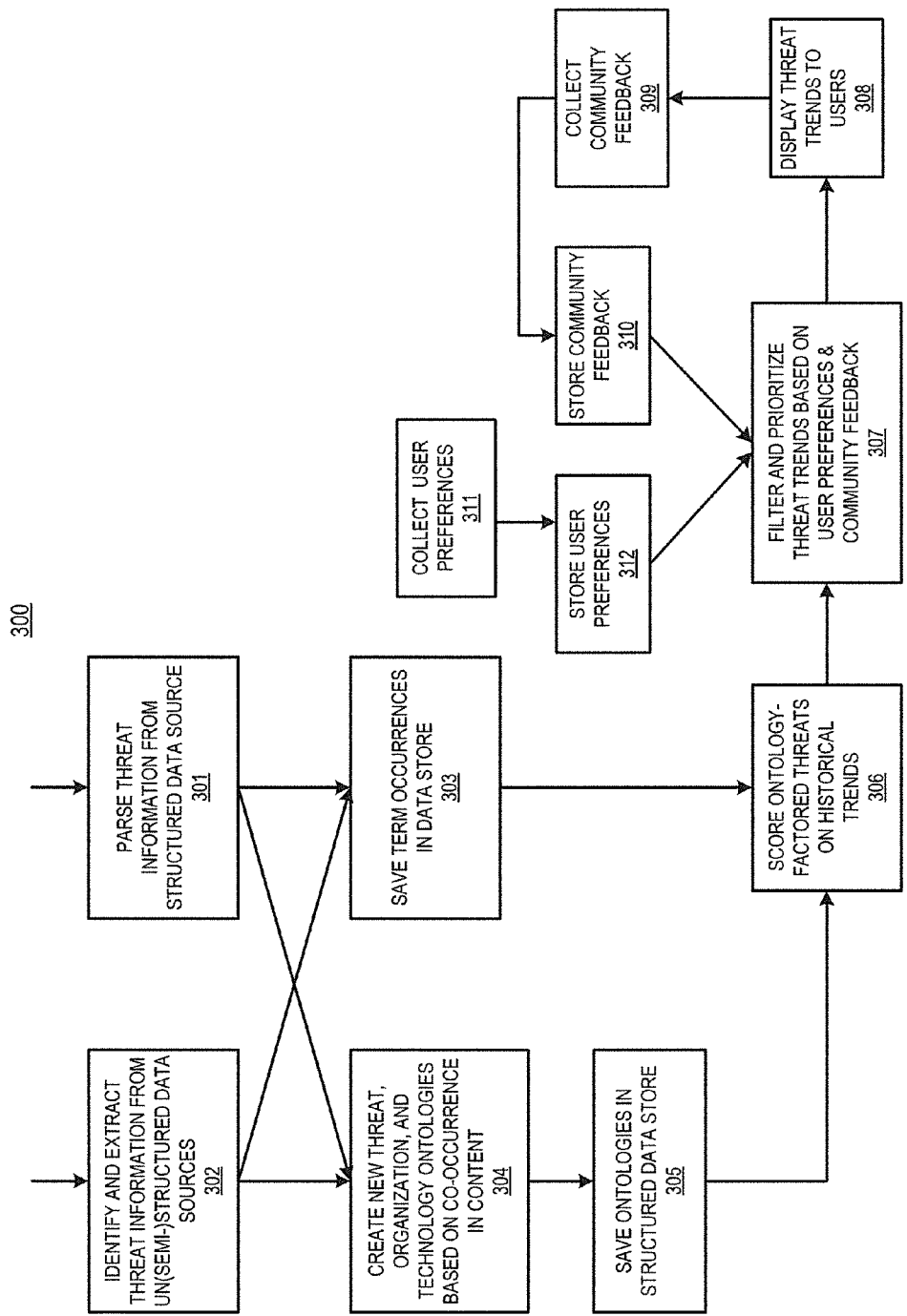
FIG. 8 illustrates a flowchart of an application of the data trend analysis system to threat trend analysis, according to an example of the present disclosure.
Figure 9:
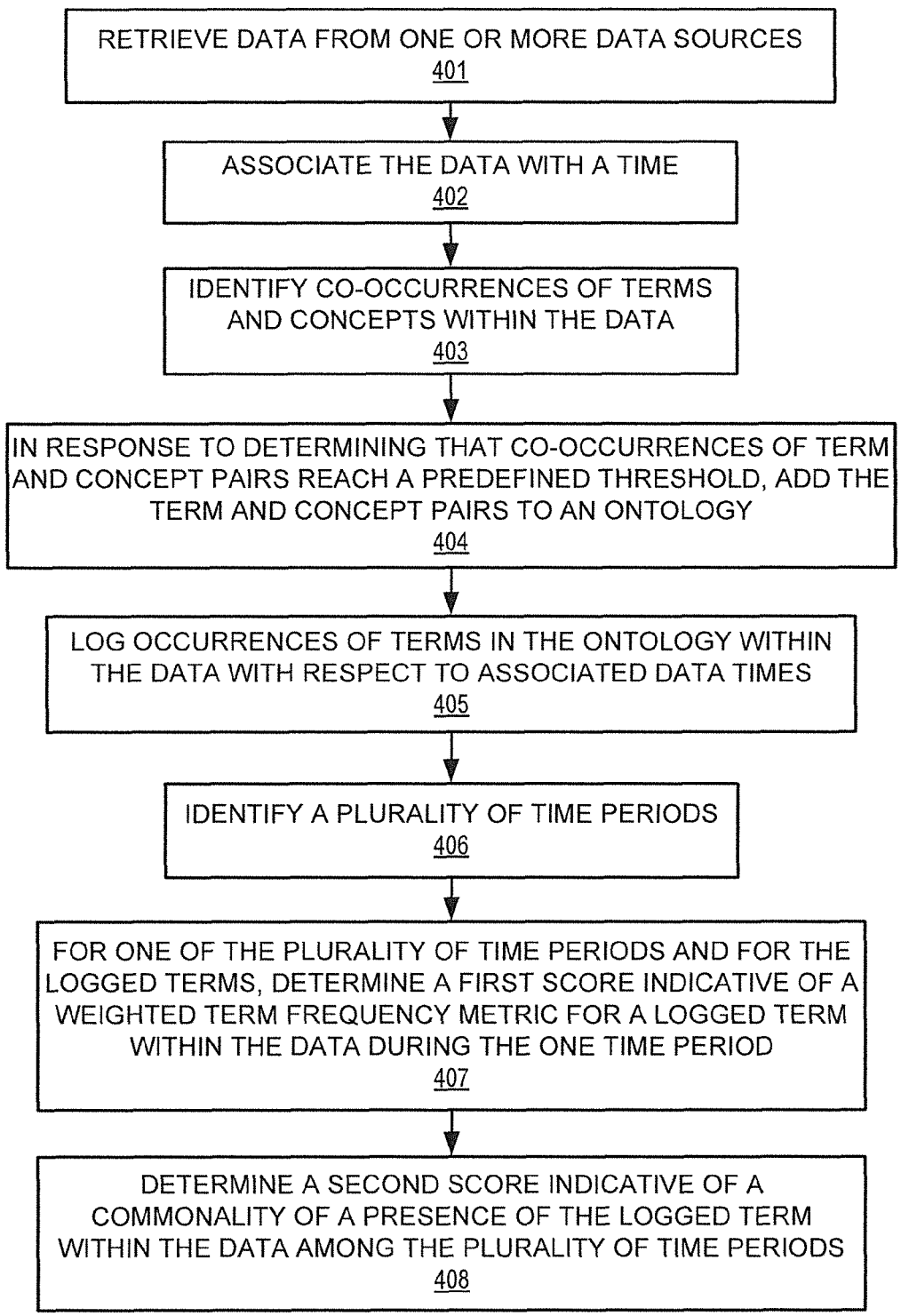
FIG. 9 illustrates a method for data trend analysis, according to an example of the present disclosure.
Figure 10:
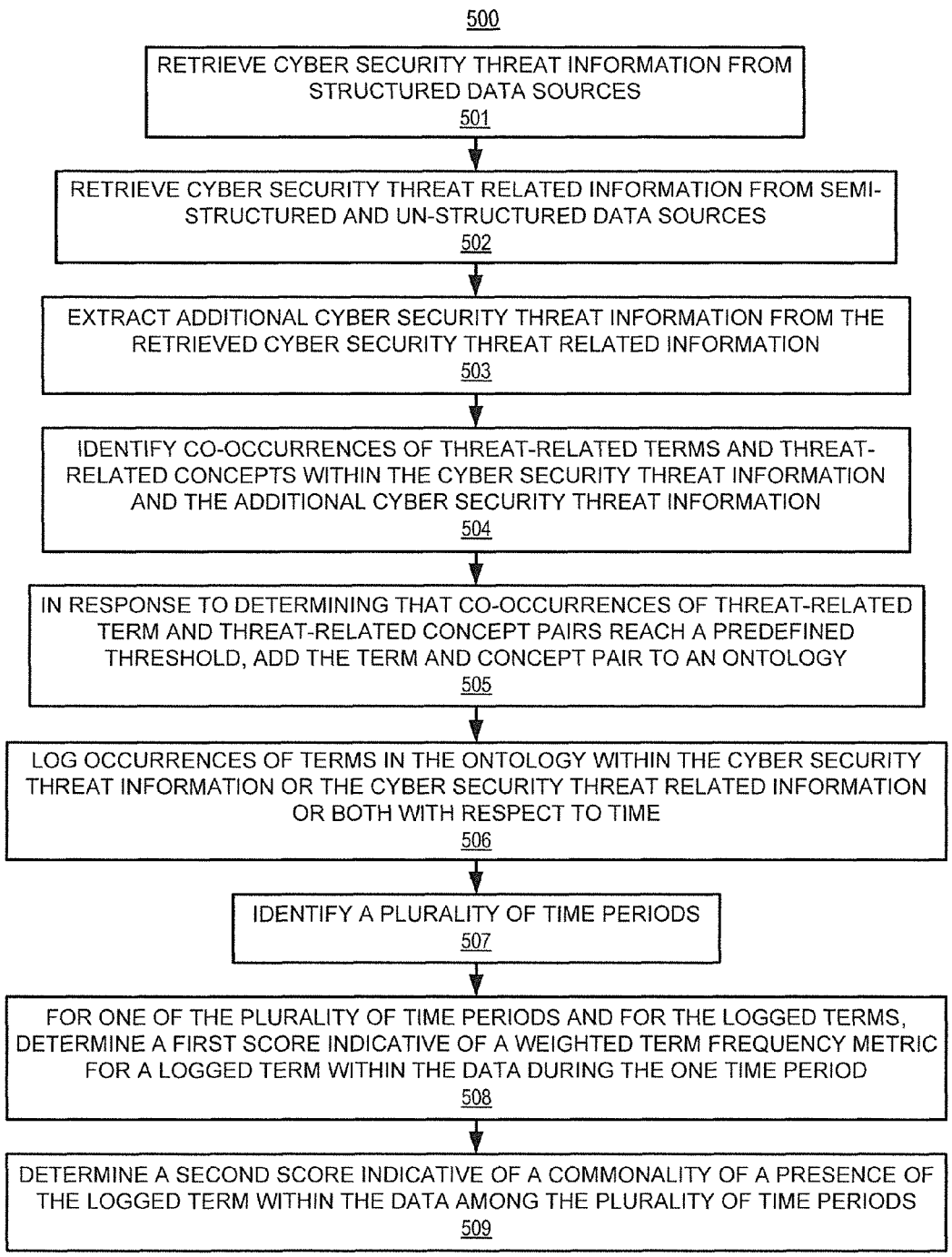
FIG. 10 illustrates further details of the method for data trend analysis for threat trend analysis, according to an example of the present disclosure.

FIG. 8 illustrates a flowchart 300 of an application of the data trend analysis system to threat trend analysis, according to an example of the present disclosure. FIGS. 9 and 10 respectively illustrate flowcharts of methods 400 and 500 for data trend analysis and forecasting cyber security threat risks, according to examples. The methods 300, 400, and 500 may be implemented on the data trend analysis system 100 described above with reference to FIGS. 1-7 by way of example and not limitation. The methods 300, 400, and 500 may be practiced in other systems.

Referring to FIG. 8, for the flowchart 300 of an application of the data trend analysis system to threat trend analysis, at block 301, the data trend analysis system 100 may retrieve and parse threat information from a structured data source. For example, referring to FIG. 1, the information parsing module 101 may retrieve and parse structured threat information from the structured data source 102.

At block 302, the data trend analysis system 100 may retrieve, identify, and extract threat information from unstructured and semi-structured data sources. For example, referring to FIG. 1, the information extraction module 103 may retrieve threat information from unstructured and semi-structured data sources 104, 105, respectively, and identify and extract terms (i.e., threat information) from the unstructured and semi-structured data sources 104, 105.

At block 303, term occurrences may be stored in a data store. For example, referring to FIG. 1, the structured data retrieved from the structured data source 102 and parsed by the information parsing module 101 may be stored as term occurrences 108 in the database 107. Further, occurrences of terms from the predetermined list of terms 106 in the data from the unstructured and semi-structured data sources 104, 105 may also be stored as term occurrences 108 in the database 107.

At block 304, threat, organization, and technology ontologies may be created and/or modified based on co-occurrence in content of the data of the data sources 102, 104, and 105. For example, referring to FIG. 1, the ontology creation module 109 may create one or more ontologies 110 (e.g., threat, organization, and technology ontologies), or modify existing ontologies 110, based on co-occurrence of terms and concepts. For example, the ontology creation module 109 may provide for improvement of the predetermined list of terms 106 by using LSA to determine relationships between terms and concepts, and adding the terms and concepts to the ontologies 110 if the co-occurrence of a term and a concept pair reaches a predetermined threshold.

At block 305, the ontologies created at block 304 may be saved in the data store. For example, referring to FIG. 1, the threat, organization, and technology ontologies may be stored in the database 107 as the ontologies 110.

At block 306, ontology factored threats may be scored based on historical trends. For example, referring to FIG. 1, the scoring module 111 may use the term occurrences 108 and the ontologies 110 to determine trends in the content of the data sources 102, 104, and 105. The ontologies 110 may be used, for example, to determine relationships between the term occurrences 108.

At block 307, threat trends may be filtered and prioritized based on user preferences and community feedback. For example, referring to FIG. 1, the trend determination module 113 may filter and prioritize the trends 112 in the content of the data sources 102, 104, and 105 based on user preferences and community feedback received, for example, via the user interface 114.

At block 308, threat trends may be displayed to users of the data trend analysis system 100. For example, referring to FIG. 1, the user interface 114 may be used to display the trends 112 (i.e., or the trends 112 based on the adjusted TF-IPF values) in the content of the data sources 102, 104, and 105 to one or more users of the data trend analysis system 100.

At block 309, the data trend analysis system 100 may collect community feedback. For example, referring to FIG. 1, the user interface 114 may be used to collect community feedback.

At block 310, the community feedback collected at block 309 may be stored. For example, referring to FIG. 1, community feedback may be stored in the database 107 as shown at 115.

At block 311, the data trend analysis system 100 may collect user preferences. For example, referring to FIG. 1, the user interface 114 may be used to collect user preferences.

At block 312, the user preferences collected at block 311 may be stored. For example, referring to FIG. 1, user preferences may be stored in the database 107 as shown at 115.

Referring to FIG. 9, for the method 400 for data trend analysis, at block 401, data may be retrieved from one or more data sources. For example, referring to FIG. 1, the information parsing module 101 may retrieve and parse structured data from the structured data source 102. Further, the information extraction module 103 may retrieve data from unstructured and semi-structured data sources 104, 105, respectively, and identify and extract terms from the unstructured and semi-structured data sources 104, 105.

At block 402, the data may be associated with a time. For example, referring to FIG. 1, the structured, unstructured and semi-structured data may be stored in the database 107 and associated with a time of retrieval or a time of data creation as specified in a data source.

At block 403, co-occurrences of terms and concepts within the data may be identified. For example, referring to FIG. 1, the ontology creation module 109 may identify co-occurrence of terms and concepts within the data of the data sources 102, 104, and 105.

At block 404, in response to determining that co-occurrences of term and concept pairs reach a predefined threshold, term and concept pairs may be added to an ontology. For example, referring to FIG. 1, the ontology creation module 109 may create one or more ontologies 110 based on co-occurrence of term and concept pairs reaching a predefined threshold.

At block 405, occurrences of terms in the ontology within the data may be logged with respect to associated data times. For example, referring to FIG. 1, the ontology creation module 109 may log occurrences of terms in the ontologies 110 within the data with respect to associated data times.

At block 406, a plurality of time periods may be identified. For example, referring to FIG. 1, the scoring module 111 may identify a plurality of time periods. The time periods may be automatically determined based, for example, on all available time periods associated with retrieval of the structured, unstructured, and semi-structured data, or based on user preferences for evaluation of the structured, unstructured, and semi-structured data within a range of a plurality of time periods.

At block 407, for one of the plurality of time periods and for the logged terms, a first score indicative of a weighted term frequency metric for a logged term within the data during the one time period may be determined. For example, referring to FIG. 1, the scoring module 111 may determine a first score (e.g., using Equation (1)) indicative of a weighted term frequency metric for a logged term within the data during the one time period. For example, the first score may be determined by determining a logarithm of a count of occurrences of the logged term within the data during the one time period.

At block 408, a second score indicative of a commonality of a presence of the logged term within the data among the plurality of time periods may be determined. For example, referring to FIG. 1, the scoring module 111 may determine a second score (e.g., using Equations (2) and (3)) indicative of a commonality of a presence of the logged term within the data among the plurality of time periods.

Referring to FIG. 10, for the method 500 for forecasting cyber security threat risks, at block 501, cyber security threat information may be retrieved from structured data sources. For example, referring to FIG. 1, the information parsing module 101 may retrieve and parse cyber security threat information from the structured data source 102.

At block 502, cyber security threat related information may be retrieved from semi-structured and un-structured data sources. For example, referring to FIG. 1, the information extraction module 103 may retrieve cyber security threat related information from unstructured and semi-structured data sources 104, 105, respectively.

At block 503, additional cyber security threat information may be extracted from the retrieved cyber security threat related information. For example, referring to FIG. 1, the information extraction module 103 may identify and extract additional cyber security threat information from the unstructured and semi-structured data sources 104, 105. The additional cyber security threat information may be identified and extracted based on the predetermined list of terms 106.

At block 504, co-occurrences of threat-related terms and threat-related concepts within the cyber security threat information and the additional cyber security threat information may be identified. For example, referring to FIG. 1, the ontology creation module 109 may identify co-occurrence of threat-related terms and threat-related concepts within the cyber security threat information and the additional cyber security threat information. For example, the ontology creation module 109 may use LSA to identify co-occurrence of threat-related terms and threat-related concepts within the cyber security threat information and the additional cyber security threat information.

At block 505, in response to determining that co-occurrences of threat-related term and threat-related concept pairs reach a predefined threshold, the term and concept pairs may be added to an ontology. For example, referring to FIG. 1, the ontology creation module 109 may create one or more ontologies 110 based on co-occurrence of threat-related term and threat-related concept pairs reaching a predefined threshold.

At block 506, occurrences of terms in the ontology within the cyber security threat information or the cyber security threat related information or both may be logged with respect to time. For example, referring to FIG. 1, the ontology creation module 109 may log occurrences of terms in the ontologies 110 within the cyber security threat information or the cyber security threat related information or both with respect to time.

At block 507, a plurality of time periods may be identified. For example, referring to FIG. 1, the scoring module 111 may identify a plurality of time periods. The time periods may be automatically determined based, for example, on all available time periods associated with retrieval of the structured, unstructured and semi-structured data, or based on user preferences for evaluation of the structured, unstructured and semi-structured data within a range of a plurality of time periods.

At block 508, for one of the plurality of time periods and for the logged terms, a first score indicative of a weighted term frequency metric for the logged term during the one time period may be determined. For example, referring to FIG. 1, the scoring module 111 may determine a first score (e.g., using Equation (1)) indicative of a weighted term frequency metric for a logged term within the data during the one time period. For example, the first score may be determined by determining a logarithm of a count of occurrences of the logged term within the data during the one time period.

At block 509, a second score indicative of a commonality of a presence of the logged term among the plurality of time periods may be determined. For example, referring to FIG. 1, the scoring module 111 may determine a second score (e.g., using Equations (2) and (3)) indicative of a commonality of a presence of the logged term within the data among the plurality of time periods.

Figure 11:
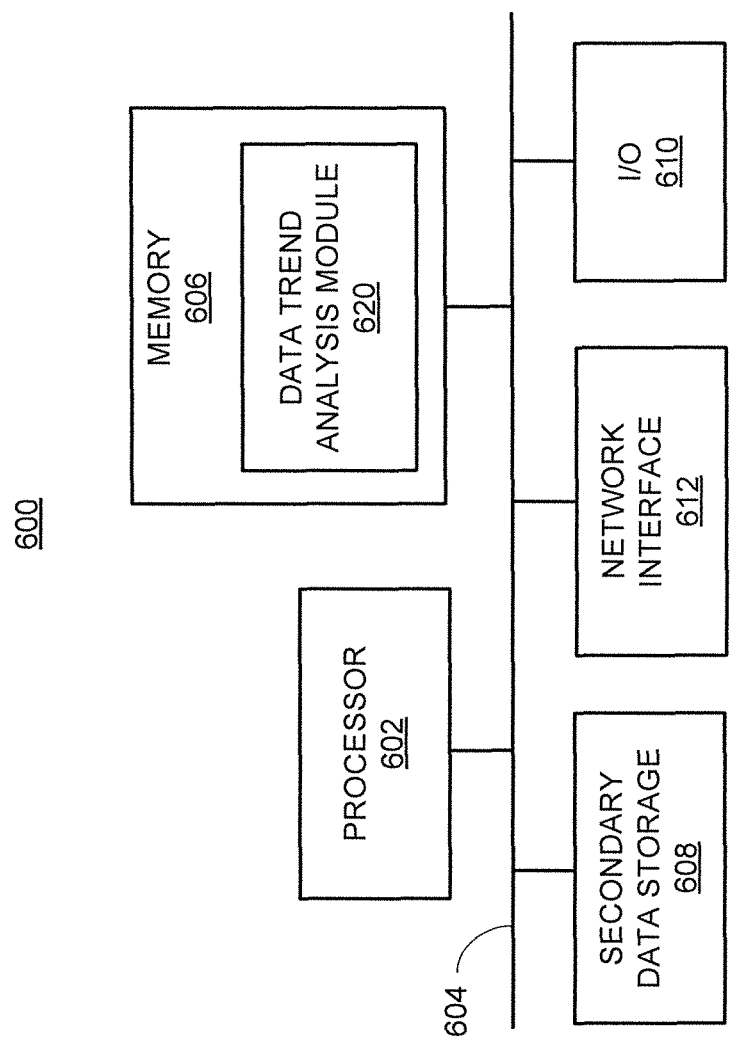
FIG. 11 illustrates a computer system, according to an example of the present disclosure.

FIG. 11 shows a computer system 600 that may be used with the examples described herein. The computer system 600 represents a generic platform that includes components that may be in a server or another computer system. The computer system 600 may be used as a platform for the system 100. The computer system 600 may execute, by a processor or other hardware processing circuit, the methods, functions and other processes described herein. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 600 includes a processor 602 that may implement or execute machine readable instructions performing some or all of the methods, functions and other processes described herein. Commands and data from the processor 602 are communicated over a communication bus 604. The computer system 600 also includes a main memory 606, such as a random access memory (RAM), where the machine readable instructions and data for the processor 602 may reside during runtime, and a secondary data storage 608, which may be non-volatile and stores machine readable instructions and data. The memory and data storage are examples of computer readable mediums. The memory 606 may include a data trend analysis module 620 including machine readable instructions residing in the memory 606 during runtime and executed by the processor 602. The module 620 may include the modules of the system 100 described with reference to FIGS. 1-7.

The computer system 600 may include an I/O device 610, such as a keyboard, a mouse, a display, etc. The computer system 600 may include a network interface 612 for connecting to a network. Other known electronic components may be added or substituted in the computer system 600.

What has been described and illustrated herein are examples along with some of their variations. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A method for cyber security threat related data trend analysis, the method comprising:
retrieving, over a computer network, cyber security threat related data from at least one data source;

associating the cyber security threat related data with a time;

identifying, by a hardware processor, co-occurrences of terms and concepts within the cyber security threat related data;

in response to determining that co-occurrences of term and concept pairs reach a predefined threshold, adding the term and concept pairs to an ontology;

logging occurrences of terms in the ontology within the cyber security threat related data with respect to associated data times;

identifying a plurality of time periods;

for one of the plurality of time periods and for the logged terms:
  determining, by the hardware processor, a first score indicative of a weighted term frequency metric for a logged term within the cyber security threat related data during the one time period by
    determining a logarithm of a count of occurrences of the logged term within the cyber security threat related data during the one time period, and
  determining, by the hardware processor, a second score indicative of a commonality of a presence of the logged term within the cyber security threat related data among the plurality of time periods;

using the first and second scores to determine a cyber security threat trend;

monitoring the at least one data source or another source related to the at least one data source based on the determined cyber security threat trend; and generating, based on the monitoring, a report indicative of the cyber security threat trend related to the cyber security threat related data.

2. The method of claim 1, wherein determining the second score further comprises:
  determining a quotient value by dividing a count of occurrences of the logged term across the plurality of time periods by a count of occurrences of the logged terms across the plurality of time periods; and
  determining a logarithm of an inverse of the quotient value.

3. The method of claim 1, wherein identifying co-occurrences of the terms and the concepts within the cyber security threat related data further comprises:
  using Latent Semantic Analysis (LSA) to identify co-occurrences of the terms and the concepts within the cyber security threat related data.

4. The method of claim 1, wherein retrieving the cyber security threat related data from the at least one data source further comprises:
  retrieving the cyber security threat related data from at least one of structured, unstructured, and semi-structured data sources;
  in response to determining that the at least one data source is the structured data source, parsing the cyber security threat related data for the structured data source; and
  in response to determining that the at least one data source is the unstructured or the semi-structured data source, identifying and extracting the terms from the unstructured or the semi-structured data sources.

5. The method of claim 1, further comprising:
  determining a third score indicative of the weighted term frequency metric for the logged term during the one time period and the commonality of the presence of the logged term among the plurality of time periods; and
  filtering the logged terms based on community feedback by multiplying the third score by a community feedback factor.

6. The method of claim 5, further comprising:
  prioritizing the filtered logged terms based on an ascending or a descending order related to the third score.

7. The method of claim 1, wherein the cyber security threat related data is related to cyber security threat information and cyber security threat related information, the method further comprises:
  retrieving the cyber security threat related data related to the cyber security threat information from a structured data source of the least one data source;
  retrieving the cyber security threat related data related to the cyber security threat related information from semi-structured and un-structured data sources of the least one data source;
  extracting additional cyber security threat information from the retrieved cyber security threat related information; and
  identifying co-occurrences of the terms and the concepts within the cyber security threat related data by identifying co-occurrences of threat-related terms and threat-related concepts within the cyber security threat information and the additional cyber security threat information.

8. A cyber security threat related data trend analysis system comprising:
  at least one hardware processor; and
  a memory storing machine readable instructions that when executed by the at least one hardware processor cause the at least one hardware processor to:
    retrieve, over a computer network, cyber security threat information from structured data sources;
    retrieve, over the computer network, cyber security threat related information from semi-structured and un-structured data sources;
    extract additional cyber security threat information from the retrieved cyber security threat related information;
    identify co-occurrences of threat-related terms and threat-related concepts within the cyber security threat information and the additional cyber security threat information;
    in response to determining that co-occurrences of threat-related term and threat-related concept pairs reach a predefined threshold, add the term and concept pairs to an ontology;
    log occurrences of terms in the ontology within the cyber security threat information or the cyber security threat related information or both with respect to time;
    identify a plurality of time periods;
    for one of the plurality of time periods and for the logged terms:
      determine a first score indicative of a weighted term frequency metric for a logged term during the one time period, and
      determine a second score indicative of a commonality of a presence of the logged term among the plurality of time periods;
    use the first and second scores to determine a cyber security threat trend;
    monitor the structured data sources or the semi-structured and un-structured data sources based on the determined cyber security threat trend;

generate, based on the monitoring, a report indicative of the cyber security threat trend;

determine a third score indicative of the weighted term frequency metric for the logged term during the one time period and the commonality of the presence of the logged term among the plurality of time periods; and filter the logged terms based on community feedback by multiplying the third score by a community feedback factor.

9. The data trend analysis system of claim 8, wherein the machine readable instructions to determine the second score further comprise machine readable instructions that when executed by the at least one hardware processor further cause the at least one hardware processor to:

determine a quotient value by dividing a count of occurrences of the logged term across the plurality of time periods by a count of occurrences of the logged terms across the plurality of time periods; and determine a logarithm of an inverse of the quotient value.

10. The data trend analysis system of claim 8, wherein the machine readable instructions to identify co-occurrences of the threat-related terms and the threat-related concepts further comprise machine readable instructions that when executed by the at least one hardware processor further cause the at least one hardware processor to:

using Latent Semantic Analysis (LSA) to identify co-occurrences of the threat-related terms and the threat-related concepts.

11. The data trend analysis system of claim 8, further comprising machine readable instructions that when executed by the at least one hardware processor further cause the at least one hardware processor to:

prioritize the filtered logged terms based on an ascending or a descending order related to the third score.

12. A non-transitory computer readable medium having stored thereon a computer executable program to provide cyber security threat related data trend analysis, the computer executable program when executed causes at least one hardware processor to:

retrieve, over a computer network, cyber security threat related data from at least one data source;

associate the cyber security threat related data with a time;

identify co-occurrences of terms and concepts within the cyber security threat related data;

in response to determining that co-occurrences of term and concept pairs reach a predefined threshold, add the term and concept pairs to an ontology;

log occurrences of terms in the ontology within the cyber security threat related data with respect to associated data times;

identify a plurality of time periods;

for one of the plurality of time periods and for the logged terms:

determine a first score indicative of a weighted term frequency metric for a logged term within the cyber security threat related data during the one time period, and determine a second score indicative of a commonality of a presence of the logged term within the cyber security threat related data among the plurality of time periods;

use the first and second scores to determine a cyber security threat trend;

monitor the at least one data source or another source related to the at least one data source based on the determined cyber security threat trend;

generate, based on the monitoring, a report indicative of the cyber security threat trend related to the cyber security threat related data;

determine a third score indicative of the weighted term frequency metric for the logged term during the one time period and the commonality of the presence of the logged term among the plurality of time periods;

filter the logged terms based on the third score; and prioritize the filtered logged terms based on an ascending or a descending order.

13. The non-transitory computer readable medium of claim 12, the computer executable program when executed further causes the at least one hardware processor to:

determine the first score by determining a logarithm of a count of occurrences of the logged term within the cyber security threat related data during the one time period.

14. The non-transitory computer readable medium of claim 12, the computer executable program when executed further causes the at least one hardware processor to:

determine the second score by determining a quotient value by dividing a count of occurrences of the logged term across the plurality of time periods by a count of occurrences of the logged terms across the plurality of time periods, and determining a logarithm of an inverse of the quotient value.

15. The non-transitory computer readable medium of claim 12, wherein the computer executable program to cause the at least one hardware processor to identify co-occurrences of the terms and the concepts within the cyber security threat related data further causes the at least one hardware processor to:

use Latent Semantic Analysis (LSA) to identify co-occurrences of the terms and the concepts within the cyber security threat related data.

16. The non-transitory computer readable medium of claim 12, the computer executable program when executed further causes the at least one hardware processor to:

retrieve the cyber security threat related data from at least one of structured, unstructured, and semi-structured data sources;

in response to determining that the at least one data source is the structured data source, parse the cyber security threat related data for the structured data source; and in response to determining that the at least one data source is the unstructured or the semi-structured data source, identify and extract the terms from the unstructured or the semi-structured data sources.

17. The non-transitory computer readable medium of claim 12, wherein the computer executable program to cause the at least one hardware processor to filter the logged terms based on the third score further causes the at least one hardware processor to:

filter the logged terms based on community feedback by multiplying the third score by a community feedback factor.

18. The non-transitory computer readable medium of claim 17, wherein the computer executable program to cause the at least one hardware processor to prioritize the filtered logged terms based on the ascending or the descending order further causes the at least one hardware processor to:

prioritize the filtered logged terms based on the ascending or the descending order related to the third score.

19. The non-transitory computer readable medium of claim 12, wherein the at least one data source includes at least one of structured, unstructured, and semi-structured data sources.

20. The non-transitory computer readable medium of claim 12, wherein the cyber security threat related data is related to cyber security threat information and cyber security threat related information, the computer executable program when executed further causes the at least one hardware processor to:
- retrieve the cyber security threat related data related to the cyber security threat information from a structured data source of the least one data source;
- retrieve the cyber security threat related data related to the cyber security threat related information from semi-structured and un-structured data sources of the least one data source;
- extract additional cyber security threat information from the retrieved cyber security threat related information; and
- identify co-occurrences of the terms and the concepts within the cyber security threat related data by identifying co-occurrences of threat-related terms and threat-related concepts within the cyber security threat information and the additional cyber security threat information.

* * * * *